(12) United States Patent
Izaki (10) Patent No.: US 10,834,311 B2
(45) Date of Patent: Nov. 10, 2020

(54) ELECTRONIC DEVICE CAPABLE OF ASSIGNING FUNCTIONS TO DIRECTIONAL OPERATING PORTIONS AND CONTROL METHOD THEREFOR

(71) Applicant: CANON KABUSHIKI KAISHA, Tokyo (JP)

(72) Inventor: Yuko Izaki, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/242,202

(22) Filed: Jan. 8, 2019

(65) Prior Publication Data

US 2019/0215445 A1    Jul. 11, 2019

(30) Foreign Application Priority Data

Jan. 9, 2018 (JP) ................................. 2018-001276

(51) Int. Cl.
*H04N 5/232* (2006.01)
*G06F 3/0484* (2013.01)
*G02B 7/09* (2006.01)

(52) U.S. Cl.
CPC .......... *H04N 5/23216* (2013.01); *G02B 7/09* (2013.01); *G06F 3/04847* (2013.01); *H04N 5/23212* (2013.01); *H04N 5/23219* (2013.01); *H04N 5/23245* (2013.01); *H04N 5/232127* (2018.08); *H04N 5/232945* (2018.08)

(58) Field of Classification Search
CPC .......... H04N 5/23216; H04N 5/23219; H04N 5/232127; H04N 5/232945; H04N 5/23212; H04N 5/232121; H04N 5/232; H04N 5/2251; H04N 5/2254; H04N 5/2253; G06F 3/04847; G02B 7/09
See application file for complete search history.

(56) References Cited

U.S. PATENT DOCUMENTS

| 2008/0240694 A1* | 10/2008 | Okazaki | ................ G03B 17/18 396/50 |
| 2008/0284856 A1* | 11/2008 | Okazaki | ............ H04N 5/23216 348/207.99 |
| 2016/0227105 A1* | 8/2016 | Kobayashi | ......... H04N 5/23216 |
| 2019/0191086 A1* | 6/2019 | Kunishige | ............ H04N 5/2251 |

FOREIGN PATENT DOCUMENTS

| JP | 2005-086509 A | 3/2005 |
| JP | 2014-016931 A | 1/2014 |

* cited by examiner

*Primary Examiner* — Gevell V Selby
(74) *Attorney, Agent, or Firm* — Cowan, Liebowitz & Latman, P.C.

(57) ABSTRACT

An electronic device according to the present invention includes: an assigning unit capable of assigning respectively different functions to a plurality of operating portions of an operating member, the plurality of operating portions indicating respectively different directions; and a control unit configured to, in response to a predetermined function indicating a corresponding direction being assigned to any one of the plurality of operating portions from a state where the predetermined function is not assigned to any of the plurality of operating portions, perform control for also assigning the predetermined function indicating a corresponding direction to the other operating portion of the plurality of operating portions.

21 Claims, 7 Drawing Sheets

ELECTRONIC DEVICE CAPABLE OF ASSIGNING FUNCTIONS TO DIRECTIONAL OPERATING PORTIONS AND CONTROL METHOD THEREFOR

BACKGROUND OF THE INVENTION

Field of the Invention

The present invention relates to an electronic device capable of control for assigning a function to an operating member and relates to a control method therefor.

Description of the Related Art

Some direction-indicating operating members move or issue an instruction in a corresponding direction. Japanese Patent Application Laid-open No. 2014-16931 discloses issuing an operation instruction in a vertical axis direction in accordance with an operation on up and down keys of an operating member which accepts operations in four directions and issuing an operation instruction in a horizontal axis direction in accordance with an operation on left and right keys of the operating member. In addition, there is a technique for assigning, in an operating member having a plurality of buttons respectively indicating a different direction, a function to each of the plurality of buttons. Japanese Patent Application Laid-open No. 2005-86509 discloses assigning a function to each button (up, down, left, or right) constituting a four-way button.

SUMMARY OF THE INVENTION

With the technique disclosed in Japanese Patent Application Laid-open No. 2014-16931, although an operation instruction in a corresponding axis direction can be issued in accordance with an operation on each direction key of the operating member, a function of each direction key cannot be changed and functions other than an operation instruction in a corresponding direction cannot be executed by an operation on each direction key. With the technique disclosed in Japanese Patent Application Laid-open No. 2005-86509, when assigning a set of functions, such as a movement instruction in a vertical direction, a movement instruction in a horizontal direction, or a movement instruction in a front-back direction, to two or more buttons in the four-way button, the functions need to be assigned one by one by performing an operation on each button.

In consideration of the problems described above, the present invention improves operability when assigning a function to an operating member indicating a plurality of operation directions.

An electronic device according to the present invention includes:

an assigning unit capable of assigning respectively different functions to a plurality of operating portions of an operating member, the plurality of operating portions indicating respectively different directions; and a control unit configured to, in response to a predetermined function indicating a corresponding direction being assigned to any one of the plurality of operating portions from a state where the predetermined function is not assigned to any of the plurality of operating portions, perform control for also assigning the predetermined function indicating a corresponding direction to the other operating portion of the plurality of operating portions.

According to the present invention, operability when assigning a function to an operating member indicating a plurality of operation directions can be improved.

Further features of the present invention will become apparent from the following description of exemplary embodiments with reference to the attached drawings.

DESCRIPTION OF THE EMBODIMENTS

Figure 1:
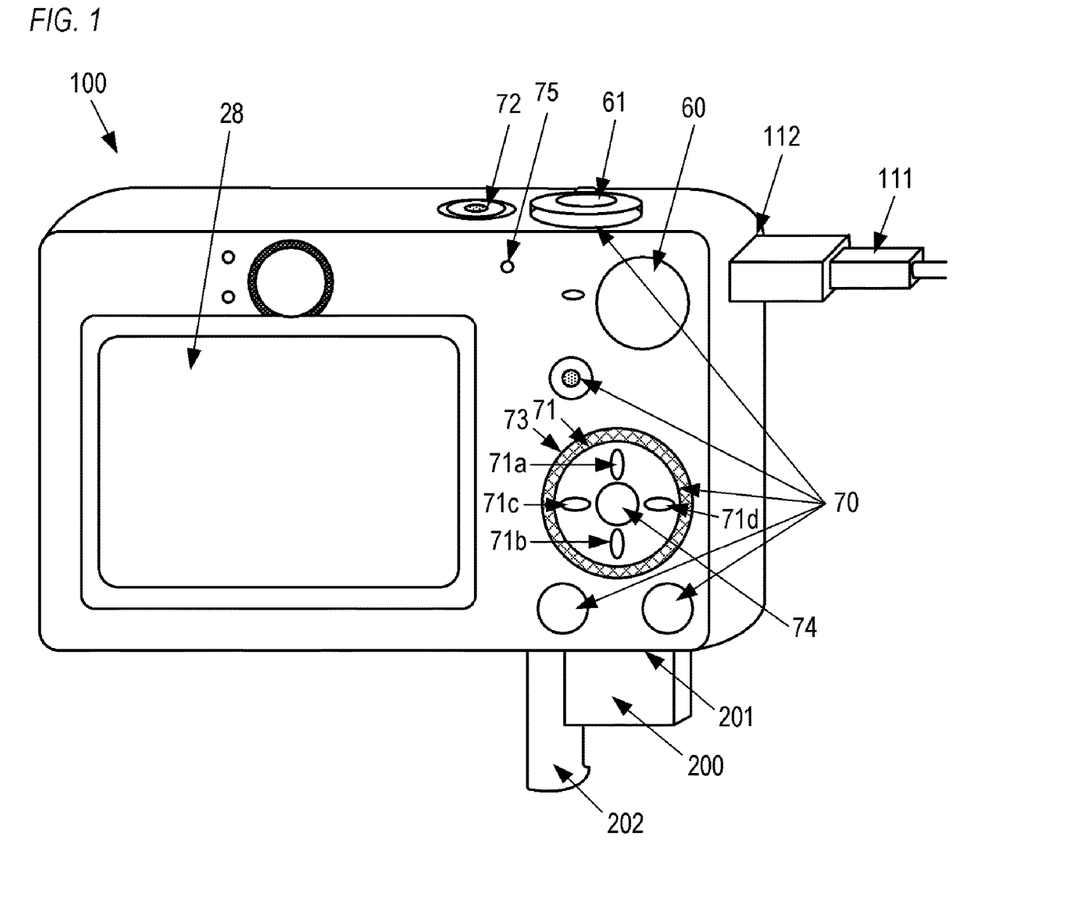
FIG. 1 is an external view of a digital camera according to the present embodiment.

An embodiment of the present invention will be described below. FIG. 1 is an external view of a digital camera 100 (an imaging apparatus) as an example of an electronic device according to the present invention. A display unit 28 is a display unit which displays various types of images and various types of information. A shutter button 61 is an operating unit for issuing a photograph instruction. A mode changeover switch 60 (a mode dial) is an operating unit for switching between various operating modes. A connecting cable 111 is a cable for connecting the digital camera 100 and an external device to each other. A connector 112 is a connector for connecting the connecting cable 111 to the digital camera 100. An operating unit 70 is an operating unit which accepts various user operations and is constituted by an operating member such as various switches, various buttons, or a touch panel. A four-way key 71 is a four-way key included in the operating unit 70. The four-way key 71 has an up key 71a which indicates an upward direction, a down key 71b which indicates a downward direction, a left key 71c which indicates a leftward direction, and a right key 71d which indicates a rightward direction. The operating unit 70 also includes an M-Fn (multi-function) button 75, a LENS button (a button positioned on a side of a lens, not shown), and a SET button 74. A controller wheel 73 is a rotationally-operable operating member which is included in the operating unit 70. A power supply switch 72 is an operating unit for switching a power supply on and off. A recording medium 200 is a recording medium such as a memory card or a hard disk. A recording medium slot 201 is a slot for storing the recording medium 200. The recording medium 200 stored in the recording medium slot 201 is capable of communicating with the digital camera 100. A lid 202 is a lid of the recording medium slot 201.

Figure 2:
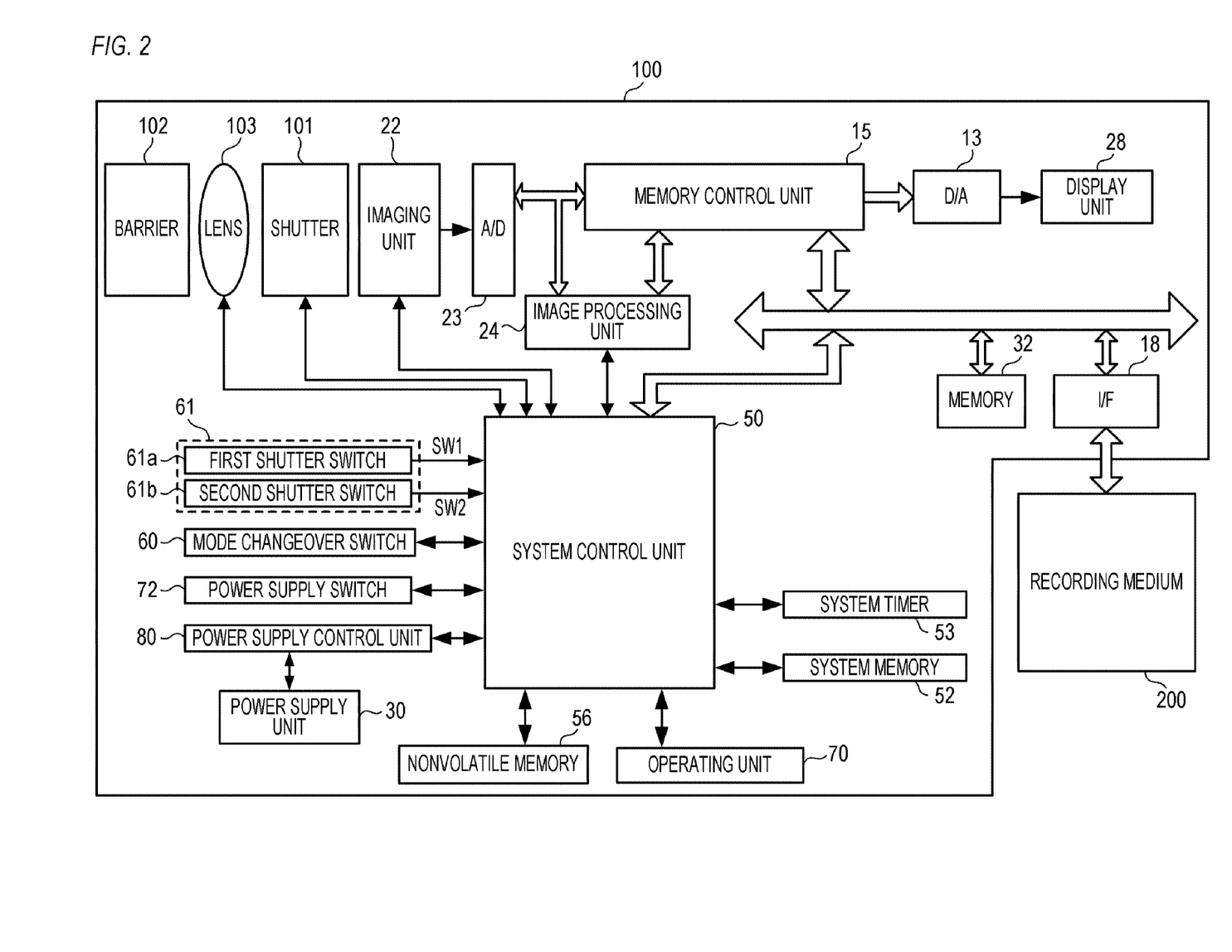
FIG. 2 is a hardware block diagram showing a configuration example of a digital camera according to the present embodiment.

FIG. 2 is a block diagram showing a configuration example of the digital camera 100. In FIG. 2, a photographic lens 103 is a lens group including a zoom lens and a focusing lens. A shutter 101 is a shutter equipped with a diaphragm function. An imaging unit 22 is an imaging element constituted by a device such as a CCD or a CMOS which converts an optical image into an electrical signal. In addition, the imaging unit 22 is equipped with a cleaning function for removing stains having adhered to the imaging element. An A/D converter 23 converts an analog signal into a digital signal. The A/D converter 23 is used to convert an analog signal output from the imaging unit 22 into a digital signal. A barrier 102 covers an imaging system of the digital camera 100 including the photographic lens 103, the shutter 101, and the imaging unit 22 to prevent the imaging system from being stained or damaged. An image processing unit 24 performs a predetermined resizing process or a predetermined color conversion process such as pixel interpolation or reduction on data from the A/D converter 23 or data from a memory control unit 15. In addition, the image processing unit 24 performs a predetermined computing process using image data of a captured image, and a system control unit 50 performs exposure control and ranging control based on a computation result obtained by the image processing unit 24. Accordingly, an AF (automatic focusing) process, an AE (automatic exposure) process, and an EF (preliminary light emission before flash) process in a TTL (through-the-lens) system are performed. The image processing unit 24 further performs a predetermined computing process using image data of a captured image and also performs an AWB (automatic white balance) process and an ISO sensitivity process in the TTL system based on an obtained computation result.

Output data from the A/D converter 23 is directly written into a memory 32 via the image processing unit 24 and the memory control unit 15 or via the memory control unit 15. The memory 32 stores image data obtained by the imaging unit 22 and converted into digital data by the A/D converter 23 and image data to be displayed on the display unit 28. The memory 32 has sufficient storage capacity for storing a predetermined number of still images and a predetermined time's worth of moving images and audio. In addition, the memory 32 also doubles as a memory (a video memory) for image display. A D/A converter 13 converts data for image display stored in the memory 32 into an analog signal and supplies the analog signal to the display unit 28. In this manner, image data for display having been written into the memory 32 is displayed by the display unit 28 via the D/A converter 13. The display unit 28 performs display in accordance with an analog signal from the D/A converter 13 on a display such as an LCD. Digital signals subjected to A/D conversion by the A/D converter 23 and accumulated in the memory 32 are D/A-converted into analog signals by the D/A converter 13 and sequentially transmitted to the display unit 28 and displayed by the display unit 28. Sequentially performing these processes realizes an electronic view finder function and enables live image display to be performed.

A nonvolatile memory 56 is an electrically erasable and recordable memory and, for example, an EEPROM is used. Constants, a program, and the like for operations of the system control unit 50 are recorded in the nonvolatile memory 56. In this case, the program refers to a program for executing the various flow charts described later in the present embodiment. The system control unit 50 controls the entire digital camera 100. The system control unit 50 realizes the respective processes of the present embodiment (to be described later) by executing the program recorded in the nonvolatile memory 56 described earlier. A system memory 52 is a RAM. Constants and variables for the operations of the system control unit 50, the program read from the nonvolatile memory 56, and the like are deployed on the system memory 52. In addition, the system control unit 50 also performs display control by controlling the memory 32, the D/A converter 13, the display unit 28, and the like. A system timer 53 is a time-measuring unit for measuring time used in various controls and measuring time according to an internal clock. The mode changeover switch 60, a first shutter switch 61a, a second shutter switch 61b, and the operating unit 70 are operating units for inputting various operation instructions to the system control unit 50.

The mode changeover switch 60 switches an operating mode of the system control unit 50 to any of a still image photography mode, a moving image photography mode, a playback mode, and the like. Modes included in the still image photography mode are an automatic photography mode, an automatic scene determination mode, a manual mode, various scene modes which represent photographic settings for different photographic scenes, a program AE mode, and custom modes. Using the mode changeover switch 60, the operating mode can be directly switched to any of these modes included in the still image photography mode. Alternatively, after temporarily switching to the still image photography mode using the mode changeover switch 60, another operating member may be used to switch to any of the modes included in the still image photography mode. In a similar manner, the moving image photography mode may also include a plurality of modes.

The first shutter switch 61a is switched on during an operation of the shutter button 61 provided on the digital camera 100 by a so-called half-press (a photography preparation instruction) and generates a first shutter switch signal SW1. In accordance with the first shutter switch signal SW1, operations such as an AF (automatic focusing) process, an AE (automatic exposure) process, an AWB (automatic white balance) process, and an EF (preliminary light emission before flash) process are started.

The second shutter switch 61b is switched on upon completion of an operation of the shutter button 61 by a so-called full-press (a photography instruction) and generates a second shutter switch signal SW2. In accordance with the second shutter switch signal SW2, the system control unit 50 starts a series of operations of a photography process from reading a signal from the imaging unit 22 to writing image data into the recording medium 200.

By selecting and operating various function icons displayed on the display unit 28, each operating member of the operating unit 70 is appropriately assigned a function for each scene and acts as one of various functions buttons. Examples of function buttons include an end button, a return button, an image feed button, a jump button, a narrow-down button, an attribute change button, and an INFO button. For example, when a menu button is pushed, a menu screen enabling various settings to be performed is displayed on the display unit 28. A user can intuitively perform various settings using the menu screen displayed on the display unit 28, the four-way key 71 (a four-way button) corresponding to upward, downward, leftward, and rightward directions, and a SET button.

As described with reference to FIG. 1, the operating unit 70 includes the four-way key 71. The four-way key 71 has the up key 71a, the down key 71b, the left key 71c, and the right key 71d. The up key 71a is an operating portion indicating the upward direction, the down key 71b is an operating portion indicating the downward direction, the left key 71c is an operating portion indicating the leftward direction, and the right key 71d is an operating portion indicating the rightward direction. The up key 71a, the down key 71b, the left key 71c, and the right key 71d may be independent keys or may be integrated with one another.

As described with reference to FIG. 1, the operating unit 70 includes the controller wheel 73. The controller wheel 73 is a rotationally-operable operating member and is used together with the four-way key 71 to instruct a selected item or the like. When the controller wheel 73 is rotationally operated, an electric pulse signal is generated in accordance with an operation amount and, based on the pulse signal, the system control unit 50 controls the various units of the digital camera 100. Based on the pulse signal, an angle or the number of rotations of a rotational operation of the controller wheel 73 can be determined. The controller wheel 73 may be any kind of operating member as long as a rotational operation can be detected. For example, the controller wheel 73 may be a dial operating member, in which case the controller wheel 73 itself rotates in accordance with a rotational operation by the user to generate a pulse signal. Alternatively, the controller wheel 73 may be an operating member constituted by a touch sensor, in which case the controller wheel 73 itself does not rotate and a rotating motion of a finger of the user on the controller wheel 73 is detected (a so-called touch wheel).

A power supply control unit 80 is constituted by a battery detection circuit, a DC-DC converter, a switching circuit for switching between blocks to be energized, and the like, and detects whether or not a battery is mounted, a type of the battery, and a remaining battery level. In addition, the power supply control unit 80 controls the DC-DC converter based on the detection results and an instruction from the system control unit 50 and supplies respective units including the recording medium 200 with necessary voltage for a necessary period of time. A power supply unit 30 is constituted by a primary battery such as an alkaline battery or a lithium battery, a secondary battery such as a NiCad battery, a NiMH battery, or a Li battery, an AC adapter, or the like. A recording medium I/F 18 is an interface with the recording medium 200 that is a memory card, a hard disk, or the like. The recording medium 200 is a recording medium such as a memory card for recording photographed images and is constituted by a semiconductor memory, a magnetic disk, or the like. A sensor 40 is a sensor such as an acceleration sensor or a face proximity sensor.

The digital camera 100 described above enables photography using central single point AF and face AF. Central single point AF refers to performing an AF process with respect to a central single point in a photography screen. Face AF refers to performing an AF process with respect to a face in the photography screen as detected by a face detection function.

The face detection function will be described. The system control unit 50 sends image data of a face detection target to the image processing unit 24. Under the control of the system control unit 50, the image processing unit 24 applies a horizontal direction bandpass filter to the image data. In addition, under the control of the system control unit 50, the image processing unit 24 applies a vertical direction bandpass filter to the processed image data. Due to the horizontal and vertical direction bandpass filters, an edge component is detected from the image data. Subsequently, the system control unit 50 performs pattern matching with respect to the detected edge component and extracts groups of candidates of eyes, nose, mouth, and ears. In addition, among the groups of extracted eye candidates, the system control unit 50 determines candidates satisfying conditions set in advance (for example, a distance between two eyes or an inclination of two eyes) to be a pair of eyes and narrows down the groups of extracted eye candidates to those including a pair of eyes. Subsequently, the system control unit 50 associates the narrowed down groups of eye candidates with other facial parts (a nose, a mouth, and ears) corresponding to the groups of eye candidates and detects a face by applying a non-facial condition filter set in advance. The system control unit 50 outputs face information in accordance with a result of the face detection and ends the process. At this point, a characteristic value such as the number of faces is stored in the system memory 52.

As described above, a characteristic value of image data being displayed in a live view or being reproduced and displayed can be extracted and object information can be detected by performing an image analysis on the image data. While face information has been described as an example of object information in the present embodiment, object information also includes various kinds of information such as red-eye determination, eye detection, closed-eye detection, and smile detection.

Face AE, face FE, and face WB can be performed concurrently with face AF. Face AE refers to optimizing exposure of an entire screen in accordance with a brightness of a detected face. Face FE refers to dimming a flash by focusing on the detected face. Face WB refers to optimizing WB of an entire screen in accordance with a color of the detected face.

A setting method when assigning a ranging point direct selection function to the four-way key 71 according to the present embodiment will now be described with reference to FIGS. 3 to 6C. The ranging point direct selection function is a function which involves, during photometry or during measurement by a photometric timer, moving an AF ranging point to an arbitrary position specified by the user and promptly reflecting the focusing on the object to photography. The ranging point direct selection function is intended to be used to, for example, move an AF ranging point while viewing the object in order to change a position to be brought into focus in accordance with the object. When the ranging point direct selection function is assigned to the up key 71a, the AF ranging point moves upward in accordance with an operation of the up key 71a, and when the ranging point direct selection function is assigned to the down key 71b, the AF ranging point moves downward in accordance with an operation of the down key 71b. A similar description applies to the left key 71c and the right key 71d. When the ranging point direct selection function is assigned to the four-way key 71, it is expected that all four directions (upward, downward, leftward, and rightward) are to be used. Therefore, the ranging point direct selection function needs to be assigned to all of the up key 71a, the down key 71b, the left key 71c, and the right key 71d.

Figure 3:
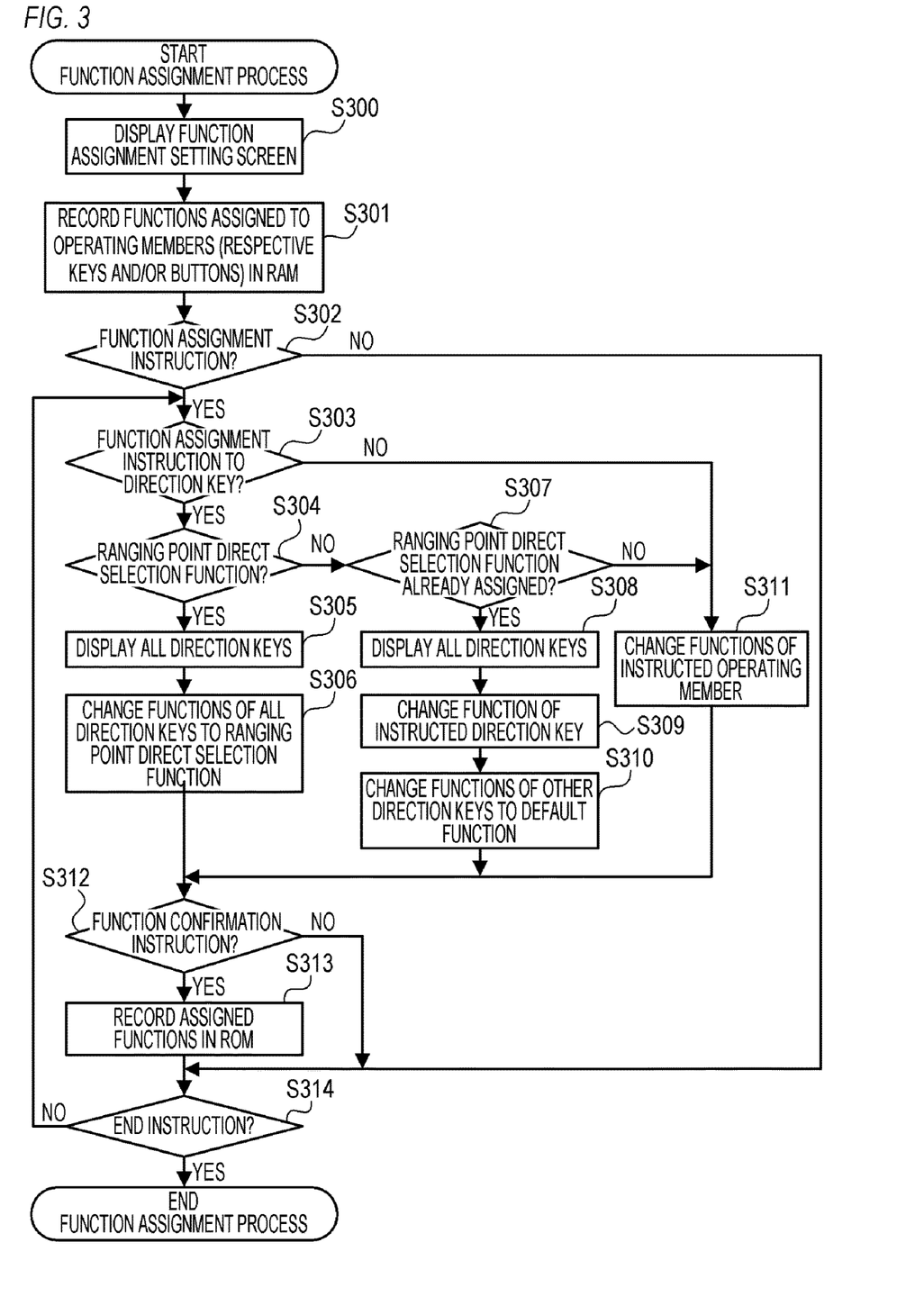
FIG. 3 is a flow chart regarding a function assignment process according to the present embodiment.

FIG. 3 is a flow chart regarding a function assignment process of the digital camera 100. Each process in the flow chart shown in FIG. 3 is realized as the system control unit 50 deploys a program stored in the nonvolatile memory 56 onto the system memory 52 and executes the program. The function assignment process shown in FIG. 3 is started when a function assignment mode is set. The operating mode transitions to the function assignment mode by operating each operating member of the operating unit 70. The function assignment mode may be set in accordance with an operation on a physical key member or the function assignment mode may be set in accordance with an operation on a touch panel.

Figure 4A:
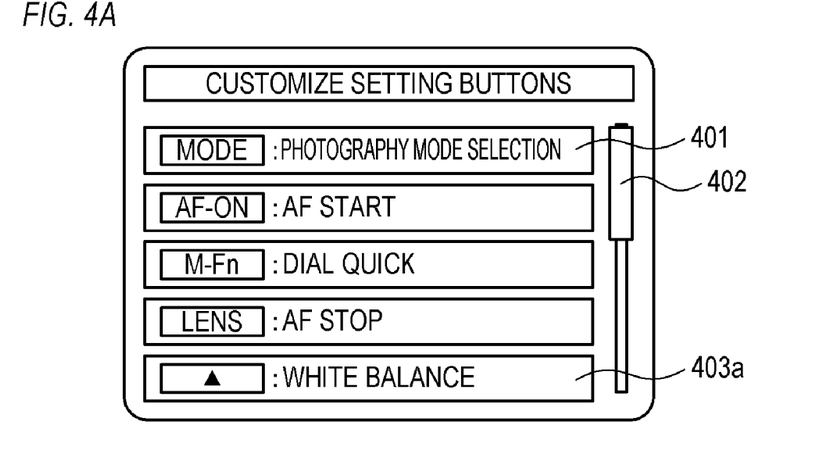
FIGS. 4A to 4C are diagrams showing an example of a function assignment setting screen according to the present embodiment.

In step S300, in order to display a function assignment setting screen on the display unit 28, the system control unit 50 reads each piece of data from the nonvolatile memory 56 and generates image data of the function assignment setting screen. FIG. 4A shows an example of the function assignment setting screen. The function assignment setting screen includes a list of sets of an operating member or each direction key and an assigned function. An item 401 represents a MODE key (a MODE button) and an assigned function thereof. An item 403a represents the up key 71a and an assigned function thereof. A scroll bar 402 (a position indicator) indicates that the list does not fit into the screen and is used to scroll the list up and down.

In step S301, the system control unit 50 reads the function assigned to the operating member (each key, button, or the like) from the nonvolatile memory 56 and records the read function as a changeable setting value in the system memory 52 that is a RAM.

In step S302, the system control unit 50 determines whether or not a function assignment instruction to the operating member has been issued. An instruction to assign a function to the operating member is executed on the function assignment setting screen by selecting an operating member by moving a cursor or performing a touch operation and then operating the left and right keys. On the function assignment setting screen, by operating the left and right keys in a state where an operating member has been selected, a function to be assigned to the operating member being selected can be switched to another function. When it is determined in step S302 that an instruction to assign a function to the operating member has been issued, the process advances to step S303, but otherwise the process advances to step S314. When selecting an operating member on the function assignment setting screen, a cursor may be displayed on a selected item 404 among items 404 to 408 as shown in FIG. 4C. Alternatively, a display color of a mark 404a representing the operating member may be changed to a color that differs from those of other marks 405a, 406a, 407a, 408a, and the like.

In step S303, the system control unit 50 determines whether or not a function assignment instruction (a function change instruction) to any of the up key 71a, the down key 71b, the left key 71c, and the right key 71d which are direction keys has occurred. When a function assignment instruction has occurred, the process advances to step S304, but otherwise the process advances to step S311.

In step S304, the system control unit 50 determines whether or not the function assignment instruction in step S303 is an instruction to assign the ranging point direct selection function. When the instruction is an instruction to assign the ranging point direct selection function, the process advances to step S305, but otherwise the process advances to step S307. In the present embodiment, the process advances from step S304 to step S305 when an instruction to assign the ranging point direct selection function occurs in a state where the ranging point direct selection function is not assigned to any of the direction keys 71a to 71d.

In step S305, the system control unit 50 determines whether or not all of the up key 71a, the down key 71b, the left key 71c, and the right key 71d fit in the function assignment setting screen and, if not, controls display so that all of the keys fit in the function assignment setting screen. In other words, the system control unit 50 controls display so that all of the up key 71a, the down key 71b, the left key 71c, and the right key 71d in the list of the function assignment setting screen are simultaneously visible.

Figure 4B:
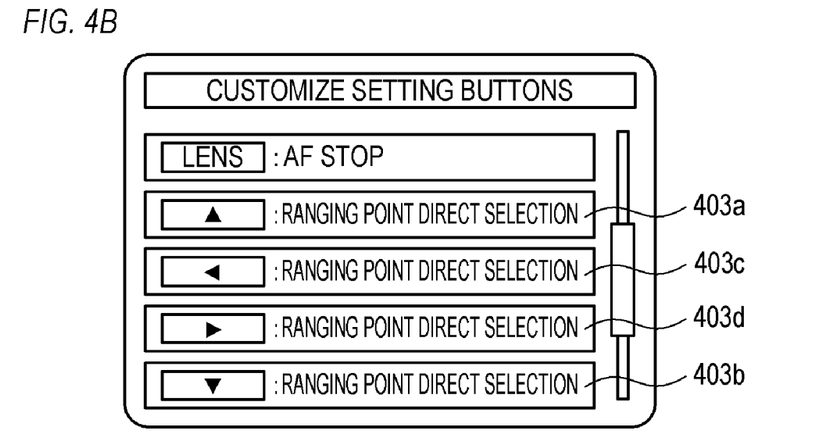
Figure 4C:
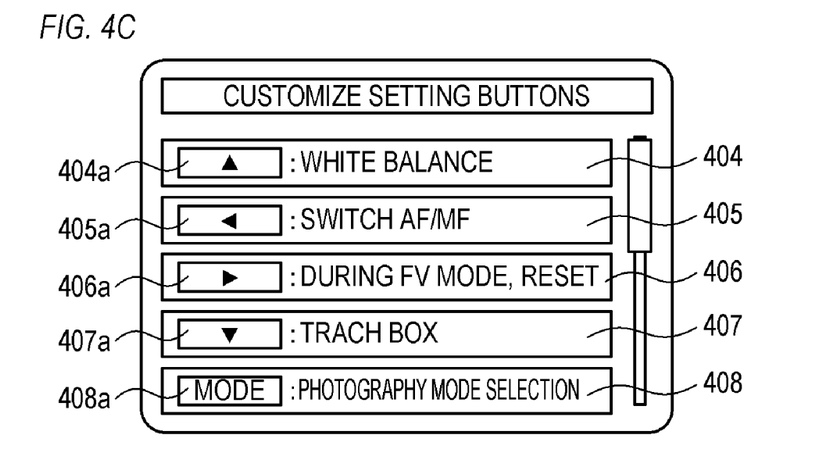

For example, as shown in FIG. 4B, the list is scrolled so that all of the up key 71a, the down key 71b, the left key 71c, and the right key 71d are simultaneously visible. As described earlier, the item 403a represents the up key 71a and an assigned function thereof. An item 403b represents the down key 71b and an assigned function thereof, an item 403c represents the left key 71c and an assigned function thereof, and an item 403d represents the right key 71d and an assigned function thereof. In addition, as shown in FIG. 4C, an order of functions (items) in the list may be changed so that all of the up key 71a, the down key 71b, the left key 71c, and the right key 71d are simultaneously visible.

In step S306, the system control unit 50 changes functions of all of the up key 71a, the down key 71b, the left key 71c, and the right key 71d to the ranging point direct selection function. Specifically, the system control unit 50 updates the functions recorded in the system memory 52 in step S301. When canceling the change to the ranging point direct selection function and restoring the original functions, the functions prior to the change may be read from the nonvolatile memory 56 and recorded in the system memory 52. In this manner, in the present embodiment, in response to the ranging point direct selection function being assigned to any one of the up key 71a, the down key 71b, the left key 71c, and the right key 71d, the ranging point direct selection function is also assigned to the other three keys.

At this point, due to the process of step S305 or the like, all of the up key 71a, the down key 71b, the left key 71c, and the right key 71d are fit in the function assignment setting screen. Therefore, the user can readily comprehend that the functions of all of the up key 71a, the down key 71b, the left key 71c, and the right key 71d have been changed to the ranging point direct selection function. Alternatively, control may be performed so that items 403a to 403d are displayed in a different color from other items on the function assignment setting screen. This also enables the fact that the functions of all of the up key 71a, the down key 71b, the left key 71c, and the right key 71d have been changed to the ranging point direct selection function to be readily comprehended.

In step S307, the system control unit 50 determines whether or not the ranging point direct selection function is assigned to all of the up key 71a, the down key 71b, the left key 71c, and the right key 71d. When the ranging point direct selection function is assigned, the process advances to step S308, but otherwise the process advances to step S311. In the present embodiment, the process advances from step S307 to step S308 when an instruction to assign a function other than the ranging point direct selection function occurs in a state where the ranging point direct selection function is assigned to all of the direction keys 71a to 71d. In addition, the process advances from step S307 to step S311 when an instruction to assign a function other than the ranging point direct selection function occurs in a state where the ranging point direct selection function is not assigned to any of the direction keys 71a to 71d.

In step S308, in a similar manner to step S305, the system control unit 50 determines whether or not all of the up key 71a, the down key 71b, the left key 71c, and the right key 71d are fit in the function assignment setting screen and, if not, controls display so that all of the keys fit in the function assignment setting screen.

In step S309, the system control unit 50 changes the function of the direction key specified in the function assignment instruction in step S303 to the function specified by the function assignment instruction. The process of step S309 involves updating the functions recorded in the system memory 52 in a similar manner to step S306.

In step S310, the system control unit 50 reads default functions of the three direction keys other than the direction key of which the function has been changed in step S309 from the nonvolatile memory 56 and changes the functions of the three direction keys to their default functions. The process of step S310 involves updating the functions recorded in the system memory 52 in a similar manner to step S306. The default functions are functions assigned by an initialization of device settings, functions assigned at the time of shipment from a factory, or the like. In this manner, in the present embodiment, in response to a function other than the ranging point direct selection function being assigned to any one of the direction keys 71a to 71d, functions other than the ranging point direct selection function are also assigned to the other three direction keys.

Functions assigned in step S310 are not limited to default functions. When a default function (the function assigned in step S310) of a direction key is assigned to another operating portion, a function not assigned to other operating portions may be assigned to the direction key. In this case, a function that can be used for both still image photography and moving image photography may be preferentially selected as a candidate of a function to be assigned to the direction key. A candidate of a function to be assigned to the direction key may be selected in a descending order of functions in a list of functions usable in still image photography.

In step S311, the system control unit 50 changes the function of the key specified in the function assignment instruction in step S303 to the function specified by the function assignment instruction. The process of step S311 involves updating the functions recorded in the system memory 52 in a similar manner to step S306. In this manner, in the present embodiment, the system control unit 50 does not perform control for assigning a function to other operating portions in response to the function being assigned to an operating portion other than the up key 71a, the down key 71b, the left key 71c, and the right key 71d.

In step S312, the system control unit 50 determines whether or not a function confirmation instruction has occurred. When a function confirmation instruction has occurred, the process advances to step S313, but otherwise the process advances to step S314. In step S313, the system control unit 50 updates the functions recorded in the nonvolatile memory 56 with the functions recorded in the system memory 52. In step S314, the system control unit 50 determines whether or not an end instruction of the function assignment process has occurred. When an end instruction has occurred, the system control unit 50 ends the function assignment process and causes the screen to transition to a photography standby screen, a predetermined menu screen, or the like. Otherwise, the process advances to step S303.

The function confirmation instruction may double as the end instruction of the function assignment process. Specifically, when the function confirmation instruction occurs in step S312, the process of step S313 may be performed to end the function assignment process, but otherwise the process may advance to step S303. In addition, when the function confirmation instruction does not occur, the system control unit 50 may perform control so as to restore the functions of the up key 71a, the down key 71b, the left key 71c, and the right key 71d to their original functions.

Figure 5:
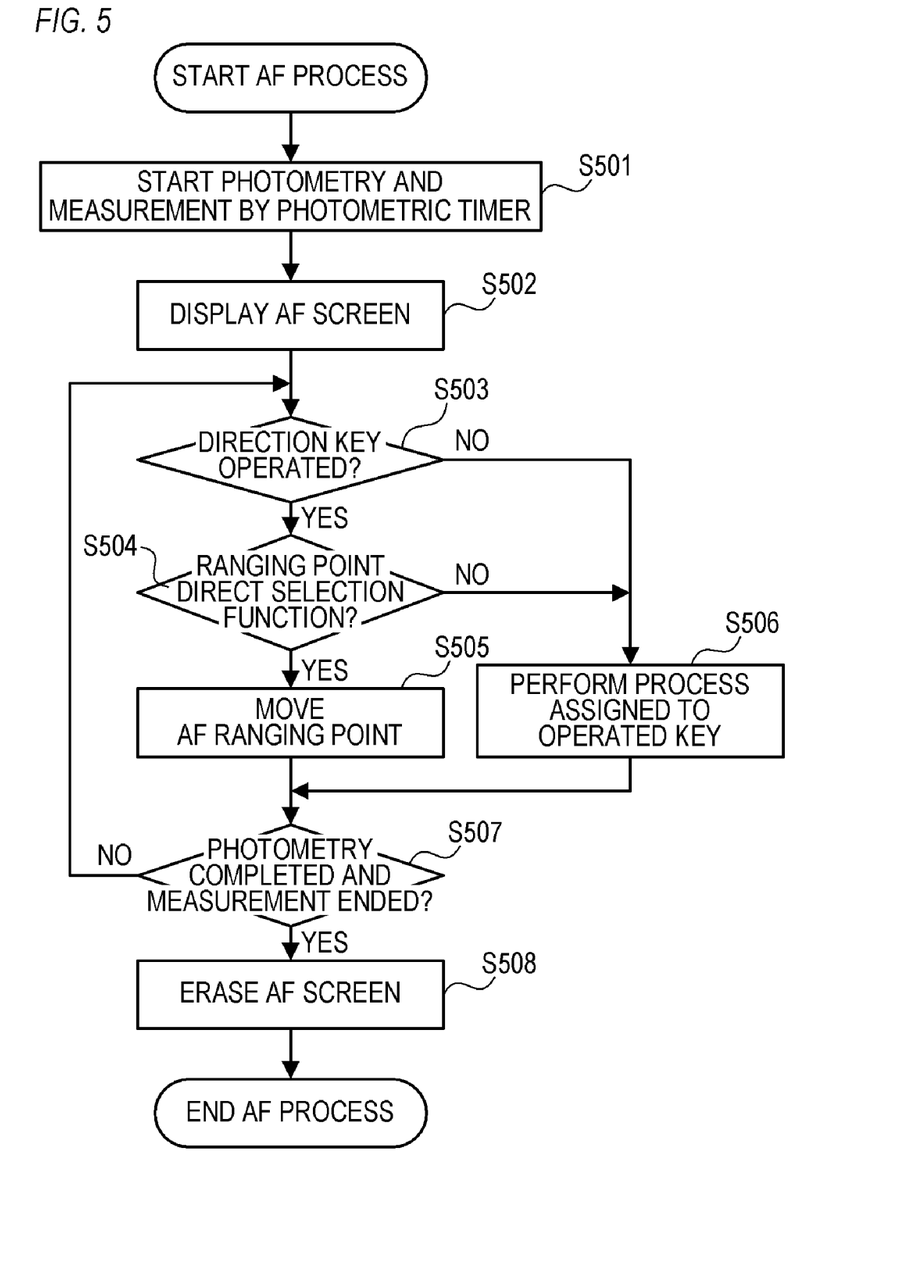
FIG. 5 is a flow chart regarding an AF process according to the present embodiment.

FIG. 5 is a flow chart regarding an AF process of the digital camera 100. Each process in the flow chart shown in FIG. 5 is realized as the system control unit 50 deploys a program stored in the nonvolatile memory 56 onto the system memory 52 and executes the program. The AF process shown in FIG. 5 starts when a photography mode is set and a photometry instruction or a photometric timer start instruction is issued. When the first shutter switch 61a is switched on and the first shutter switch signal SW1 is generated, a photometry instruction or a photometric timer start instruction is issued. When the operating unit 70 has an operating member having a photometry start instruction function, a photometry instruction or a photometric timer start instruction is also issued when the operating member is operated. In the present embodiment, the system control unit 50 does not perform control for switching an assigned functions in response to the switching of operating modes.

In step S501, the system control unit 50 performs control so as to start photometry and measurement by a photometric timer. A timing of completion of photometry depends on the situation. A measurement by the photometric timer is started in response to the start of photometry and ends once a predetermined period of time has elapsed. When photometry is started in response to the first shutter switch signal SW1, the photometric timer may start at a timing where the first shutter switch 61a is switched off and the first shutter switch signal SW1 is no longer present. Once the measurement by the photometric timer ends, the state of the digital camera 100 is restored to the photography standby state.

Figure 6A:
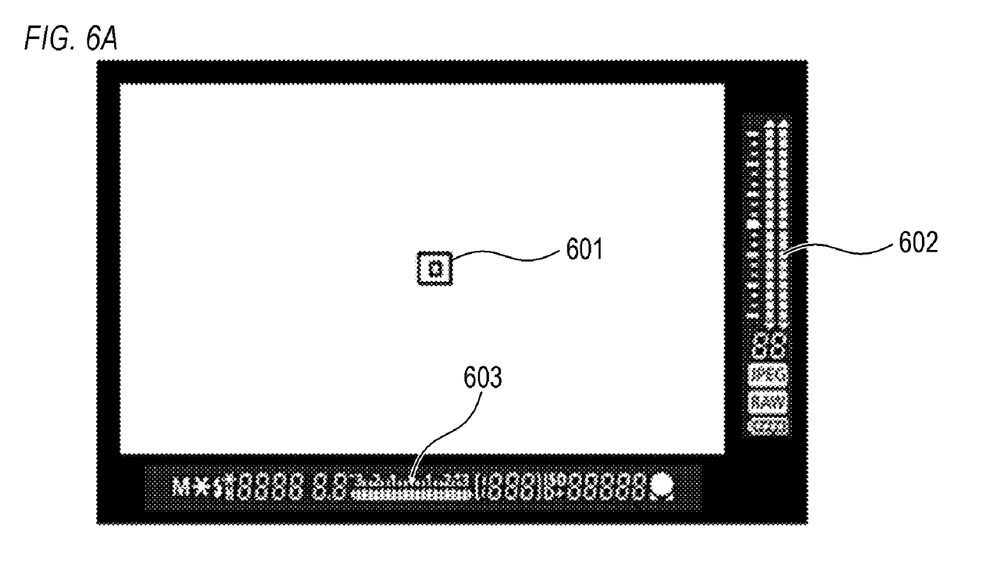
FIGS. 6A to 6C are diagrams showing an example of an AF screen according to the present embodiment.

In step S502, the system control unit 50 performs control so as to display an AF screen on the display unit 28 which is functioning as a finder. FIG. 6A shows an example of the AF screen. The AF screen includes an AF ranging point 601 and items 602 and 603. The items 602 and 603 are a plurality of segments or the like that represent a result of photometry and/or set parameters using illumination patterns. The AF screen is displayed superimposed on an object image. The user can readily confirm a positional relationship between the object and an AF ranging point by checking the AF screen superimposed on the object image.

In step S503, the system control unit 50 determines whether or not any of the up key 71a, the down key 71b, the left key 71c, and the right key 71d has been operated. When any of the up key 71a, the down key 71b, the left key 71c, and the right key 71d has been operated, the process advances to step S504, but otherwise the process advances to step S506.

In step S504, the system control unit 50 determines whether or not the ranging point direct selection function is assigned to the up key 71a, the down key 71b, the left key 71c, and the right key 71d. When the ranging point direct selection function is assigned, the process advances to step S505, but otherwise the process advances to step S506.

Figure 6B:
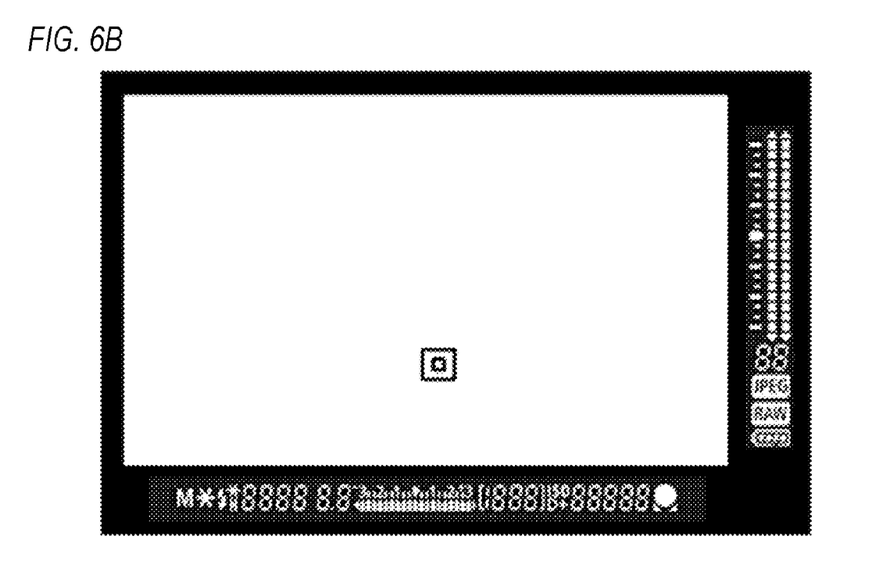
Figure 6C:
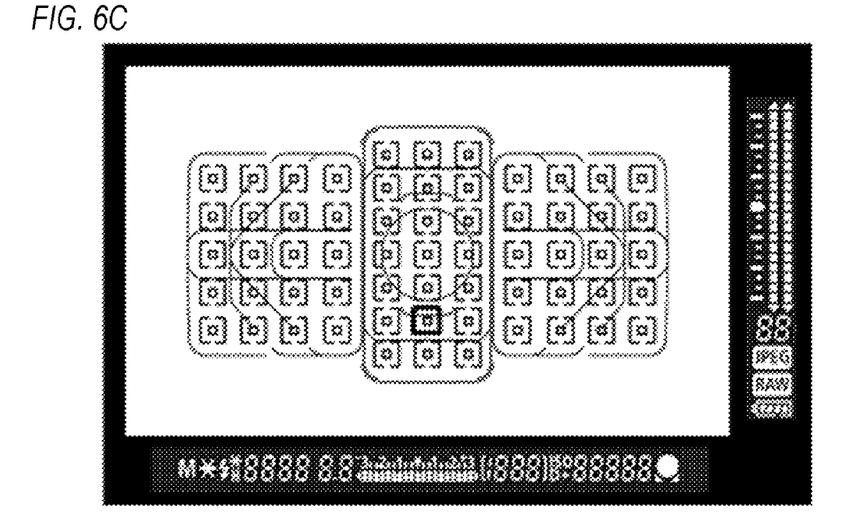

In step S505, the system control unit 50 moves the AF ranging point to a direction indicated by a direction key operated in step S503. However, when a range in which the AF ranging point can be set is limited due to various conditions set in advance by respective menu settings of the digital camera 100 and characteristics of the mounted photographic lens 103, a position of the AF ranging point is updated within the limited range. FIG. 6B shows an example of a state where the AF ranging point has been moved downward in two stages from the state shown in FIG. 6A. When all ranging point positions are displayed as shown in FIG. 6C, visibility of the object deteriorates. Therefore, when updating the AF ranging point with the ranging point direct selection function, ranging point positions at which the AF ranging point can be set and the like are not displayed.

In step S506, the system control unit 50 performs a process of the function assigned to the key operated in step S503.

In step S507, the system control unit 50 determines whether or not the photometry has been completed and the measurement by the photometric timer has ended. When the photometry has been completed and the measurement by the photometric timer has ended, the process advances to step S508, but otherwise the process advances to step S503. In step S508, the system control unit 50 performs control so as to erase the AF screen from the display unit 28.

As described above, according to the present embodiment, in response to a function being assigned to any of the up key, the down key, the left key, and the right key, the function is automatically assigned to the other three direction keys. Therefore, the trouble of assigning functions can be mitigated and omissions in function assignments can be prevented. The ranging point direct selection function is a function used by a user desiring to freely change the AF ranging point upward, downward, leftward, or rightward while tracking an object.

For example, when the user unintentionally sets a movement of the AF ranging point to the up key but forgets to set a movement of the AF ranging point to the down key, the following situation occurs. Specifically, when using the ranging point direct selection function, although the AF ranging point is moved by the up key, the AF ranging point cannot be moved by the down key and a change is made to white balance. As a result, there is a possibility that the white balance setting is inadvertently changed or an operation to move the AF ranging point cannot be performed as swiftly as desired. Accordingly, being unable to change the AF ranging point so as to follow a movement of the object, out-of-focus photography may be performed and a photo opportunity may be missed. In the present embodiment, such situations can be avoided.

The SET button 74 normally determines an operation in accordance with the pressing of a button. Therefore, when a function indicating a direction such as the AF ranging point is assigned to the SET button 74, since it is highly likely that the function has been intentionally set by the user, setting the AF ranging point to other buttons in an interlocked manner with the function is avoided. In a similar manner, even when the user has set, to the M-Fn button and the LENS button, a function indicating a direction or, in other words, a function which improves operability by being assigned as a set to a plurality of operating portions, functions to be assigned are not changed in an interlocked manner with the function.

In addition, when movement is limited to only one direction, since the user needs to perform an operation of making a circuit in order to move by one unit of movement in an opposite direction, operability improves by enabling a setting that allows movement in a plurality of directions.

The various controls described above as controls to be performed by the system control unit 50 may be carried out by one piece of hardware, or a plurality of pieces of hardware may control an entire apparatus by sharing processes.

In addition, while the present invention has been described in detail based on a preferred embodiment thereof, the present invention is not limited to the specific embodiment and various modes without departing from the scope of the invention are also included in the present invention. Furthermore, the embodiment described above simply represents an example of the present invention and the embodiment can also be combined with other embodiments.

For example, in step S310, the system control unit 50 may restore an assigned function to a function assigned immediately prior to the ranging point direct selection function instead of assigning the default function. In addition, a set of a white balance adjustment function, a recycle bin function (a deletion function), a reset function, and an AM/MF switching function previously assigned to each of the up key 71*a*, the down key 71*b*, the left key 71*c*, and the right key 71*d* may be stored in advance. Furthermore, when the white balance function is assigned to the up key 71*a*, the stored set of functions may be assigned to the down key 71*b*, the left key 71*c*, and the right key 71*d*. In other words, when a function previously set to any one key is assigned, the set of set functions may be assigned to the other keys. With respect to each of a plurality of previous timings, a set of functions having been set at the timing may be stored.

Keys of which functions are changed in an interlocked manner are not limited to the up key 71*a*, the down key 71*b*, the left key 71*c*, and the right key 71*d*. Only the function of the up key 71*a* and the function of the down key 71*b* may be changed in an interlocked manner or only the function of the left key 71*c* and the function of the right key 71*d* may be changed in an interlocked manner. Specifically, in response to the function of one of two direction keys (a set of the up key 71*a* and the down key 71*b*, a set of the left key 71*c* and the right key 71*d*, or the like) being changed, the function of the other key may be changed. In other words, when the up key 71*a* is selected and a given function is selected and assigned, a function forming a pair with the function is automatically assigned to the down key 71*b*. Keys of which functions are changed in an interlocked manner may include operating portions other than the up key 71*a*, the down key 71*b*, the left key 71*c*, and the right key 71*d*. The number of keys of which functions are changed in an interlocked manner may be three or five or more.

The function to be matched between a plurality of direction keys need not be the ranging point direct selection function for moving a position where an AF process is to be performed. The function to be matched between a plurality of direction keys may be another predetermined function (such as a cursor movement function) for indicating a corresponding direction. The function for indicating a direction need not be a movement instruction in the vertical direction or a movement instruction in the horizontal direction and may be a movement instruction in a front-back direction.

While the number of assignable functions is not particularly limited, the number of assignable functions is preferably two times or more of the number of operating portions. Setting the number of assignable functions to such a number enables functions of all operating portions to be collectively changed to an unassigned function.

The timing at which functions of other direction keys are changed as described in step S306 may be the timing at which a confirmation operation is performed in step S312.

In addition, when a function is not assigned to the mode changeover switch 60 (the mode dial) by the user, photography modes can be switched by performing a rotational operation of the mode changeover switch 60 (the mode dial) in the horizontal direction. When the user sets a function indicating a direction such as a movement of the AF ranging point to the mode changeover switch 60 (the mode dial), a movement of the AF ranging point in the horizontal direction is performed using the mode changeover switch 60 (the mode dial). Furthermore, a movement of the AF ranging point in the vertical direction may be assigned to the up key 71*a* and the down key 71*b* or may be assigned to another rotary dial.

Furthermore, while an example in which the present invention is applied to a digital camera has been described in the embodiment presented above, the present invention is not limited to this example and can be applied to any electronic device capable of performing control for assigning functions to operating members. Specifically, the present invention can be applied to a personal computer, a PDA, a mobile phone terminal, a mobile image viewer, a printer apparatus equipped with a display, a digital photo frame, a music player, a game device, an electronic book reader, a tablet terminal, a smartphone, a projection apparatus, an electric home appliance or a car-mounted apparatus equipped with a display, and the like.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-001276, filed on Jan. 9, 2018, which is hereby incorporated by reference herein in its entirety.

What is claimed is:
1. An electronic device comprising:
a processor; and
a memory storing a program which, when executed by the processor, causes the electronic device to:
assign respectively different functions to a plurality of operating portions including directional operating portions indicating respectively different directions; and
when a directional instruction function for instructing each direction corresponding to each directional operating portion is assigned to one of the directional operating portions in response to a user operation, change automatically to assign the directional instruction function to the other directional operating portion which has been assigned a function other than the directional instruction function.
2. The electronic device according to claim 1, wherein the directional instruction function is a function for moving a position at which an AF process is to be performed in a direction corresponding to a directional operating portion.

3. The electronic device according to claim 1, wherein the directional operating portions are respectively corresponding to an upward direction, a downward direction, a leftward direction, and a rightward direction.
4. The electronic device according to claim 1, wherein the program
when executed by the processor further causes the electronic device to
change automatically to assign a first function other than the directional instruction function to the directional operating portion to which has been assigned the directional instruction function, when another directional operating portion which has been assigned to the directional instruction function is changed to assign a second function other than the directional instruction function in response to a user operation.
5. The electronic device according to claim 4, wherein the first function is a default function.
6. The electronic device according to claim 4, wherein, the first function assigned to the directional operating portion is different from the function assigned to the other operating portions.
7. The electronic device according to claim 1, wherein the program
when executed by the processor further causes the electronic device to
in a case where, after the directional instruction function is assigned to the other directional operating portion, a user operation for confirming the assignment of the directional instruction function to the other directional operating portion is not performed, control for restoring the directional instruction function of the directional operating portions to original functions other than the directional instruction function.
8. The electronic device according to claim 1, wherein the program
when executed by the processor further causes the electronic device to
display a list of the plurality of operating portions on a screen; and
wherein the directional operating portions are displayed in a color that differs from that of other operating portions, in the list.
9. The electronic device according to claim 1, wherein the program
when executed by the processor further causes the electronic device to
display a part of a list of the plurality of operating portions on a screen; and
wherein a part including all the directional operating portions are displayed such that they are simultaneously visible in the part of the list when the directional instruction function is selected for assigning to the directional operating portion in response to a user operation.
10. The electronic device according to claim 1, wherein the function assigned to the operating portion is not changed in response to switching of operating modes of the electronic device.
11. The electronic device according to claim 1, wherein the directional instruction function is a function for moving an item displayed on a display unit in a direction corresponding to a directional operating portion.
12. An electronic device comprising:
a processor; and
a memory storing a program which, when executed by the processor, causes the electronic device to:

select one of a plurality of operating portions including directional operating portions indicating respectively different directions, in response to a user operation;
select a function to be assigned to the selected operating portion from a plurality of functions, in response to a user operation; and
in a case where the selected operating portion is a first directional operating portion and the selected function is a directional instruction function for instructing each direction corresponding to each directional operating portion, automatically assign the directional instruction function to a second directional operating portion that differs from the first directional operating portion, and in a case where the selected operating portion is the first directional operating portion and the selected function is a function that differs from the directional instruction function, assign a function selected in response to a user operation to the second directional operating portion.

13. The electronic device according to claim 12, wherein the program
when executed by the processor further causes the electronic device to
detect an instruction for a first direction that corresponds to the first directional operating portion in a case where the first directional operating portion is operated, and detect an instruction for a second direction that corresponds to the second directional operating portion in a case where the second directional operating portion is operated, wherein
the directional instruction function is a function for moving an item displayed on a display unit in a direction corresponding to the operated directional operating portion in accordance with the detected instruction.

14. The electronic device according to claim 12, wherein the directional operating portions are respectively corresponding to an upward direction, a downward direction, a leftward direction, and a rightward direction.

15. The electronic device according to claim 13, further comprising:
an imaging unit configured to capture an object; and
wherein the program when executed by the processor further causes the electronic device to
execute an AF process, wherein
the item indicates an AF ranging point.

16. The electronic device according to claim 12, wherein the function that differs from the directional instruction function is at least one of a photography mode selection, an AF start instruction, an AF stop instruction, white balance adjustment, a deletion instruction, and a reset instruction.

17. A control method for an electronic device, comprising:
assigning respectively different functions to a plurality of operating portions including directional operating portions indicating respectively different directions; and
when a directional instruction function for instructing each direction corresponding to each directional operating portion is assigned to one of the directional operating portions in response to a user operation, changing automatically to assign the directional instruction function to the other directional operating portion which has been assigned a function other than the directional instruction function.

18. A control method for an electronic device, comprising:
selecting one of a plurality of operating portions including directional operating portions indicating respectively different directions, in response to a user operation;
selecting a function to be assigned to the selected operating portion from a plurality of functions, in response to a user operation; and
in a case where the selected operating portion is a first directional operating portion and the selected function is a directional instruction function for instructing each direction corresponding to each directional operating portion, automatically assign the directional instruction function to a second directional operating portion that differs from the first directional operating portion, and in a case where the selected operating portion is the first directional operating portion and the selected function is a function that differs from the directional instruction function, assign a function selected in response to a user operation to the second directional operating portion.

19. A non-transitory computer readable medium that stores a program,
wherein
the program causes a computer to execute a control method for an electronic device, and
the control method includes:
assigning respectively different functions to a plurality of operating portions including directional operating portions indicating respectively different directions; and
when a directional instruction function for instructing each direction corresponding to each directional operating portion is assigned to one of the directional operating portions in response to a user operation, changing automatically to assign the directional instruction function to the other directional operating portion which has been assigned a function other than the directional instruction function.

20. A non-transitory computer readable medium that stores a program,
wherein
the program causes a computer to execute a control method for an electronic device, and
the control method includes:
selecting one of a plurality of operating portions including directional operating portions indicating respectively different directions, in response to a user operation;
selecting a function to be assigned to the selected operating portion from a plurality of functions, in response to a user operation; and
in a case where the selected operating portion is a first directional operating portion and the selected function is a directional instruction function for instructing each direction corresponding to each directional operating portion, automatically assign the directional instruction function to a second directional operating portion that differs from the first directional operating portion, and in a case where the selected operating portion is the first directional operating portion and the selected function is a function that differs from the directional instruction function, assign a function selected in response to a user operation to the second directional operating portion.

21. The electronic device according to claim 5, wherein the default function is at least one of a photography mode selection, an AF start instruction, an AF stop instruction, white balance adjustment, a deletion instruction, and a reset instruction.

* * * * *